United States Patent [19]
Corbett et al.

[11] Patent Number: 5,540,045
[45] Date of Patent: Jul. 30, 1996

[54] STEAM INJECTION SYSTEM FOR A COMBUSTION TURBINE GAS GENERATOR

[75] Inventors: Nicholas C. Corbett, Solihull; Norman P. Lines, Rugby; Lynn I. T. Steward, Coventry, all of England

[73] Assignee: Rolls-Royce plc, London, United Kingdom

[21] Appl. No.: 306,959

[22] Filed: Sep. 16, 1994

Related U.S. Application Data

[62] Division of Ser. No. 70,338, filed as PCT/GB91/02100, published as WO92/09791, Jun. 11, 1992, Pat. No. 5,369,951.

[30] Foreign Application Priority Data

Nov. 27, 1990 [GB] United Kingdom ............ 9025778

[51] Int. Cl.$^6$ ..................................... F02C 3/30
[52] U.S. Cl. ............................ 60/39.3; 60/39.55
[58] Field of Search .................. 60/39.3, 39.55, 60/39.53, 39.05, 39.57, 39.58, 39.094, 39.463, 742

[56] References Cited

U.S. PATENT DOCUMENTS

| | | | |
|---|---|---|---|
| 2,959,005 | 11/1960 | Zaba ........................... | 60/39.55 |
| 3,353,360 | 11/1967 | Gorzegno . | |
| 3,693,347 | 9/1972 | Kydd et al. . | |
| 3,705,491 | 12/1972 | Foster-Pegg ................. | 60/39.55 |
| 4,148,185 | 4/1979 | Somers . | |
| 4,259,837 | 4/1981 | Russell et al. . | |
| 4,387,559 | 6/1983 | Leto . | |
| 4,541,367 | 9/1985 | Lindberg . | |
| 4,735,043 | 4/1988 | Hamill et al. . | |
| 4,753,068 | 6/1988 | El-Masri . | |
| 4,790,269 | 12/1988 | Hamill et al. . | |
| 4,893,467 | 1/1990 | Woodson ..................... | 60/39.05 |
| 4,969,324 | 11/1990 | Woodson ..................... | 60/39.05 |
| 5,058,374 | 10/1991 | Bechlher et al. . | |
| 5,095,694 | 3/1992 | Shekleton et al. ............ | 60/39.094 |
| 5,369,951 | 12/1994 | Corbett et al. ................ | 60/39.3 |

FOREIGN PATENT DOCUMENTS

| | | |
|---|---|---|
| 0318706 | 7/1989 | European Pat. Off. . |
| 2713831 | 5/1978 | Germany . |
| 3419560 | 11/1985 | Germany . |
| 0054824 | 5/1977 | Japan ........................ 60/39.55 |
| 0159517 | 12/1979 | Japan ...................... 60/39.094 |
| 186083 | 9/1922 | United Kingdom . |
| 2034822 | 6/1980 | United Kingdom . |
| 1587780 | 4/1981 | United Kingdom . |
| 2085528 | 4/1982 | United Kingdom . |
| 2122333 | 1/1984 | United Kingdom . |
| 2219070 | 11/1989 | United Kingdom . |
| 2219045 | 11/1989 | United Kingdom . |
| WO9005877 | 5/1990 | WIPO . |

*Primary Examiner*—Timothy S. Thorpe
*Attorney, Agent, or Firm*—Cushman Darby & Cushman, L.L.P.

[57] ABSTRACT

A duel fuel gas generator (10) is provided with a steam injection system (48) having a bleed-off valve (66) and a steam metering valve which are controlled in concert by a controller (50) to supply steam to a steam manifold (22) for injection into the gas generator at rapidly variable rates independent of the steam supply rate from a boiler (42, FIG. 1). A proportion of the system can be preheated using a steam warm-up flow through the bleed-off valve (66). A further portion of the system can be purged and preheated using compressor delivery air to flow through a steam metering valve (80), a purge valve (74) and a drain valve (94). To control the degree of superheat at the steam manifold (22), water can be injected through a metering valve (90) and a vortex mixer (92), and to purge condensation from a gas fuel manifold (30, FIG. 7) of the gas generator, compressor delivery air can be allowed to flow through the manifold (30), a supply line (108) and a purge valve (112) to atmosphere.

20 Claims, 4 Drawing Sheets

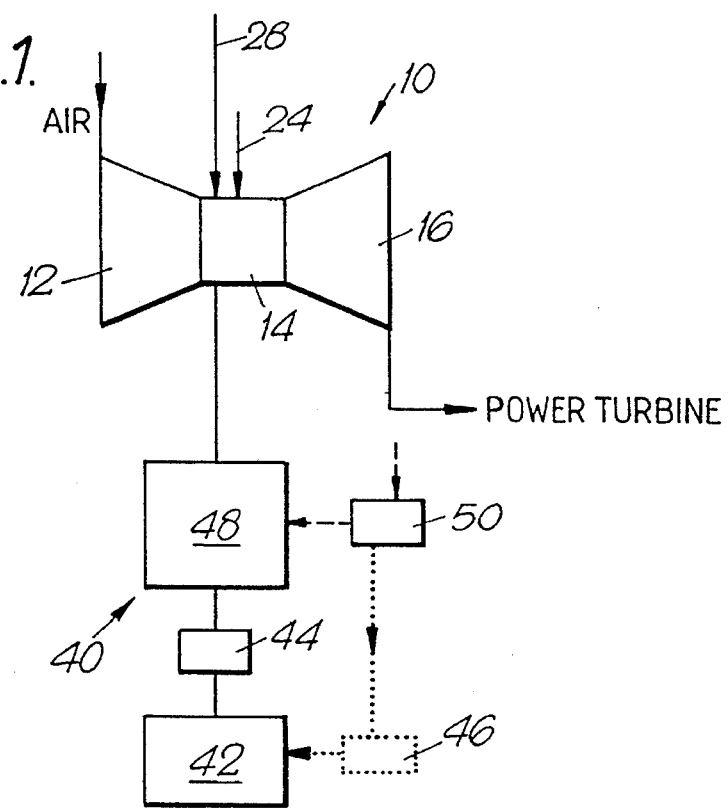
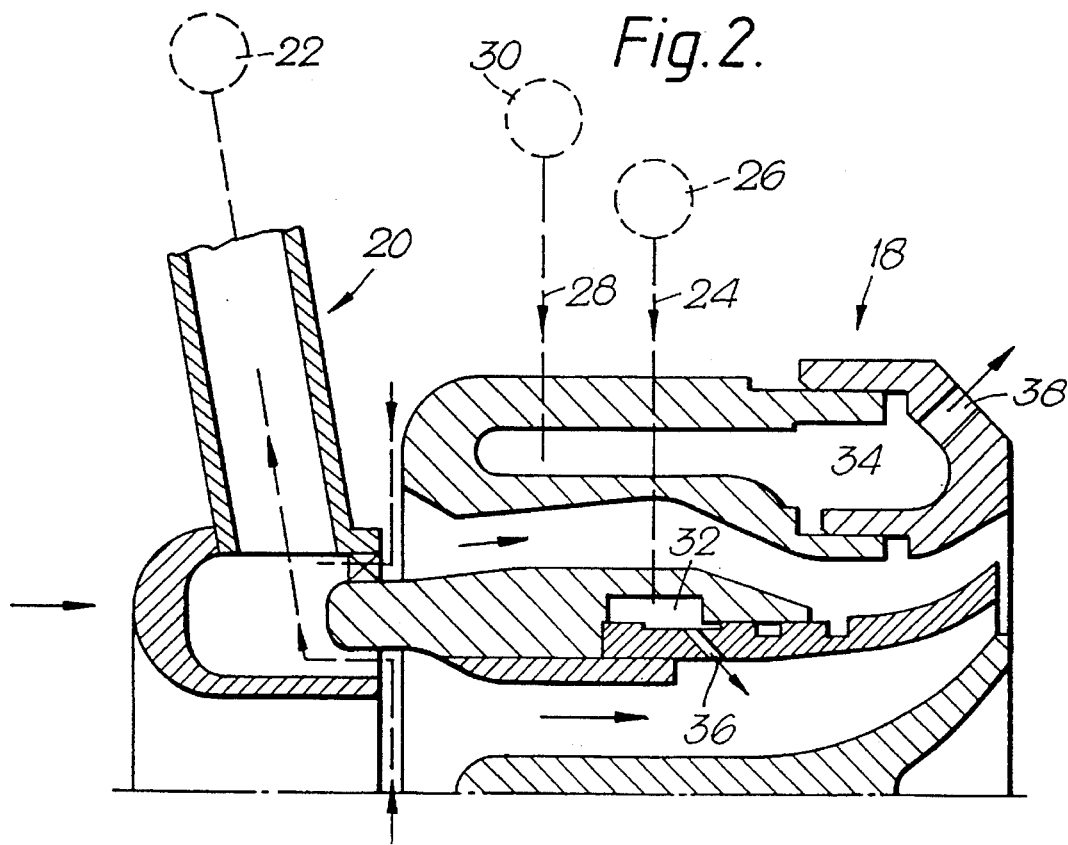

STEAM INJECTION SYSTEM FOR A COMBUSTION TURBINE GAS GENERATOR

This is a division of application Ser. No. 08/070,338, filed as PCT/GB91/02100, Nov. 27, 1991, published as WO92/09791, Jun. 11, 1992, now U.S. Pat. No. 5,369,951.

FIELD OF THE INVENTION

This invention relates to gas generators, e.g., industrial gas turbine engines for producing electrical or mechanical power. These may De used as part of a combined cycle power plant, or for providing power for process plants.

The invention is particularly relevant to gas generators which can operate on both liquid and gaseous fuels and which are provided with steam injection, primarily to reduce emissions of nitrous oxides (NOx) in their exhausts.

BACKGROUND OF THE INVENTION

It is well known to use steam injection to reduce NOx emissions from gas turbine engines and/or to boost their powers. United Kingdom patent application no. 2219070 discloses a dual fuel injector provided with a steam injector to inject steam into a gas turbine combustor when the engine is operating on liquid fuel. It should be noted that steam can also be injected when the engine is operating on gas fuel only. When the engine is operating on liquid fuel a proportion of delivery air from the compressor of the engine is allowed to flow through purge holes in the fuel injector to provide a positive flow of air through the gas nozzles in order to prevent these nozzles becoming partially or wholly blocked by carbon deposits which can accumulate when operating on liquid fuel only.

However, the steam is injected into the compressor delivery flow upstream of the fuel injector and thus it is possible for a mixture of steam and air to enter the gas fuel passages. These passages comprise a small gas fuel manifold within the fuel injector, a large outer gas fuel manifold around the engine, supply ducts from the outer gas manifold to the fuel injectors, and a gas fuel supply pipe to the outer manifold. When the engine operates on gas fuel, the fuel pressure is higher than that of the compressor delivery air and therefore obviates any air flow into the gas passages, but when operating on liquid, fuel, the steam will be at higher pressure than the gas passages and will therefore enter them. On contacting the relatively cold air in the gas fuel supply system, the steam will condense and the condensate will collect in the gas fuel passages. If an attempt is made to initiate a fuel transfer to gas fuel, or the engine is shut down and restarted on gas fuel, condensate which may have collected in the gas fuel supply passages may be injected into the engine through the gas fuel nozzles in the fuel injector when the gas fuel supply valve is opened. This may have an undesirable effect on the combustion process.

BRIEF STATEMENTS OF INVENTION

The present invention seeks, among other things, to provide a convenient means of draining condensate which has collected in the gas fuel supply passages.

Accordingly, the present invention provides a gas generator having a compressor, a combustor, combined gas and liquid fuel injector means for the combustor, steam injector means located upstream of the fuel injector means and downstream of the compressor, gas fuel supply means connected to the fuel injector means, purge valve means connected to the gas fuel supply line for venting the gas fuel supply means externally of the gas generator, and control means for scheduling the purge valve means to open whenever the gas generator is operating on liquid fuel with steam injection, whereby high pressure air and steam exits from the fuel injector means through the gas fuel supply means and is vented through the purge valve means.

The gas fuel supply means preferably comprises gas manifold means connected to the fuel injector means, and a gas fuel supply line connected to the gas manifold, the purge valve means being connected to the gas fuel supply line for venting the high pressure air and steam therefrom.

The purge valve means can comprise an upstream manual shut-off valve in addition to a purge valve scheduled by the control means, and a restriction can be provided downstream of the purge valve for restricting the volume of the purge flow so that gas generator performance is not impaired.

When the gas generator is operational, the amount of steam required for injection at any given moment will depend upon the power demand on the gas generator, which may be a rapidly varying quantity. Steam injection must therefore be catered for by a control system which increases or decreases the amount of steam injected at a rate of change sufficient to meet rapidly varying demand for steam corresponding to rapidly varying power demand. Since steam demand for the gas generator is likely to vary much more rapidly than the output of the steam supply, the best strategy is to ensure that an oversupply of steam is available for most or all gas generator operating conditions and to provide a means of dumping from the steam injection system all steam which is not immediately needed for injection into the gas generator.

Accordingly, the present invention provides a gas generator steam injection system comprising steam supply means, steam injection means for injecting steam into the gas generator, a steam metering-,valve for metering steam flow to the steam injection means, a steam bleed-off valve for bleeding off steam from a point in the system upstream of the steam metering valve, and control means for modulating the steam bleed-off valve and steam metering valve to provide the steam flow required to the steam injector means.

The present invention also seeks to provide a gas generator steam injection system comprising steam supply means, steam injection means for injecting steam into the gas generator, a steam metering valve for metering the flow of steam from the steam supply means, a steam bleed-off valve for bleeding off steam from the system prior to the steam metering valve, and control means for modulating the steam bleed-off valve and the steam metering valve in concert with each other such that the supply rate of steam to the gas generator is independent of the supply rate from the steam supply means.

The steam bleed-off valve can vent to atmosphere or it can be connected to a process plant.

Preferably the steam injection system includes a shut-off cock downstream of the steam bleed off point but upstream of the steam metering valve. The control means closes the shut-off cock while steam is vented to atmosphere through the bleed-off valve during the time when the steam injection system is being warmed up prior to operation of the gas generator with steam injection.

It is important to ensure that the steam at the point of injection into the gas generator is of the correct quality. The steam should be in a single phase, not containing any water droplets, and of a desired (precalculated) degree of superheat.

To prevent condensation of the steam in the steam injection system at startup and to prevent thermal shock to components of the system, the present invention seeks to provide a means of preheating the system between the steam supply means and the steam shut-off cock.

Accordingly, the present invention provides a steam injection system for a gas generator, comprising steam supply means, steam injector means for injecting steam into the gas generator, a steam shut-off cock between the steam supply means and the steam injector means, a steam warm-up valve for allowing steam to exit the system from a point in the system upstream of the shut-off cock to a lower pressure location, and control means for maintaining the shut-off cock closed whilst the steam pressure and temperature increase to operational values prior to injection of steam into the gas generator and for opening the steam warm-up valve to vent a flow of steam through the warm-up valve to preheat the steam injection system upstream of the shut-off cock.

The preferred embodiment contemplates that the steam warm-up valve and the steam bleed-off valve previously mentioned should be the same valve.

The present invention also seeks to provide a means of preheating and purging the steam injection system downstream of the steam shut-off cock and for draining the steam injection means of condensate.

Accordingly the present invention provides a steam injection system for a gas generator comprising a compressor and a combustor downstream of the compressor, the steam injection system comprising steam supply means, a steam manifold connected to a plurality of steam injectors for injecting steam into the gas generator downstream of the compressor, a shut-off cock, a steam metering valve downstream of the shut-off cock, a purge valve connected to the system between the shut-off cock and the steam metering valve, and control means for closing the shut-off cock and opening the steam metering valve and the purge valve to allow compressed air to flow from the gas generator compressor through the steam injectors, the steam metering valve and the purge valve to exit from the system.

Preferably, the control means modulates the degree of opening of the steam metering valve thereby to control the rate of temperature rise in the system downstream of the steam shut-off cock.

When the temperature of the steam injection system downstream of the shut-off cock has reached a predetermined value the control means re-schedules the steam metering valve to an initial steam injection flow demand position.

A drain valve can be provided connected to the steam manifold and operated by the control means to open and allow compressor delivery air from the gas generator to flow through the steam manifold thereby to vent any condensate in the steam manifold to atmosphere through the drain valve.

It is important to monitor the state of the steam prior to injection into the gas generator for a number of reasons. Dry saturated steam is required for all injection of steam and the point at which water vapour changes into a homogenous state is a minimum requirement. It is very important that the steam contains no water droplets, as any droplets could impinge on the gas generator combustor and high pressure turbine, causing erosion.

As the steam temperature above the wholly saturated vapour phase line increases, the amount of steam required to produce the required degree of NOx emission reduction by cooling the combustor primary zone will also increase due to the reduced heat transfer from the combustion products to the steam. Also the density of the steam decreases as the steam temperature increases for a dry saturated vapour, i.e., it becomes superheated. Thus, to provide the same mass flow rate of steam through the steam injector into the gas generator, a greater pressure difference across the steam injector is required.

Furthermore, as the steam approaches the boiling point temperature of water, condensates may form due to local cold spots. These condensates are erosive to gas generator components and must be avoided.

It is therefore important to control the steam temperature within a band hot enough to prevent the formation of water droplets and cool enough to maintain effective primary zone cooling.

The present invention seeks to provide a means of controlling steam temperature at the steam manifold at a response rate which can maintain the steam temperature within a predetermined temperature band according to gas generator demand.

Accordingly, the present invention provides a steam injection system for a gas generator, comprising steam supply means, steam injection means for injecting steam into the gas generator, a steam metering valve located between the steam Supply means and the steam injection means for metering the supply of steam from the steam supply means, a water and steam mixing means located between the steam metering valve and the steam injection means, a water metering valve for metering water into the water and steam mixing means, and control means for measuring the degree of superheat of the steam in the steam injection means and modulating the water and steam metering valves to control the flow of water and steam respectively into the mixing means to adjust the degree of superheat within predetermined limits.

The present invention also seeks to provide a steam injection system for a gas generator having a compressor and a combustor downstream of the compressor, comprising steam supply means, steam injection means for injecting steam into the gas generator downstream of the compressor, a steam metering valve located between the steam supply means and the steam injection means for metering the supply of steam from the steam supply means, a steam bleed-off valve for bleeding off steam from the steam injection system prior to the steam metering valve, means for preheating and purging the system prior to injection of steam into the gas generator by allowing steam from the steam supply means to pass through the steam bleed-off valve and air from the gas generator compressor to pass through the steam metering valve, and means for modulating the steam bleed-off valve and the steam metering valve in concert with each other such that the supply rate of steam to the gas generator is independent of the supply rate from the steam supply means.

If required, the steam injection system can also include means for controlling the degree of superheat of the steam in the steam injection means.

where the gas generator combustor is gas fired with gas fuel from a gas fuel manifold, there is also provided means for purging the gas fuel manifold of condensate using high pressure air from the compressor.

The present invention further provides a gas generator steam injection and control system comprising steam supply means, steam injection means, steam flow control means, steam preheat means for preheating an upstream part of the system, and compressed air purge and preheat means for preheating and purging a downstream part of the system.

Again, as necessary, the system may also include steam injection temperature control means and gas fuel manifold purge means.

The steam flow control means can comprise a steam metering valve, a bleed-off valve for bleeding off steam from a point in the system upstream of the metering valve, and control means for controlling the supply of steam to the steam injection means at a required rate by simultaneously modulating the bleed-off valve and the steam metering valve.

The steam preheat means can comprise the steam bleed-off valve, a steam shut-off cock downstream of the steam bleed-off point and control means for closing the shut-off cock and opening the bleed-off valve to allow a flow of steam to pass through the part of the system upstream of the shut-off cock and through the bleed-off valve.

The compressed air purge and preheat means can comprise a purge valve venting externally of the gas generator from a point downstream of the steam shut-off cock and upstream of the steam metering valve, a source of hot high-pressure air, and control means for opening the steam metering valve and the purge valve, thereby allowing the air to flow through the system in a reverse direction thereby preheating the system downstream of the steam shut-off cock and purging the system of any condensate.

The control means preferably monitors the temperature of the system downstream of the shut-off cock and schedules the steam metering valve to control the rate of temperature rise within predetermined limits.

The steam injection means can also be provided with a drain valve operated by the control means to allow the hot high-pressure air to flow through the steam manifold to purge any condensate in the steam injection means through the drain valve to atmosphere.

The steam temperature control means can comprise a water and steam mixer downstream of the steam metering valve, a water metering valve for metering water into the mixer, and control means for monitoring the condition of the steam in the steam manifold and scheduling the water metering valve and the steam metering valve to maintain the degree of superheat of the steam in the steam injection means within a predetermined band.

BRIEF DESCRIPTION OF THE DRAWINGS

An exemplary embodiment of the present invention will now be described with reference to the accompanying drawings in which:

FIG. 1 shows diagrammatically a dual fuel gas generator having one form of steam injection apparatus and control means according to the present invention, FIG. 2 shows a dual fuel injector and steam injector in the gas generator of FIG. 1.

DETAILED DESCRIPTION OF THE DRAWINGS

Figure 3:
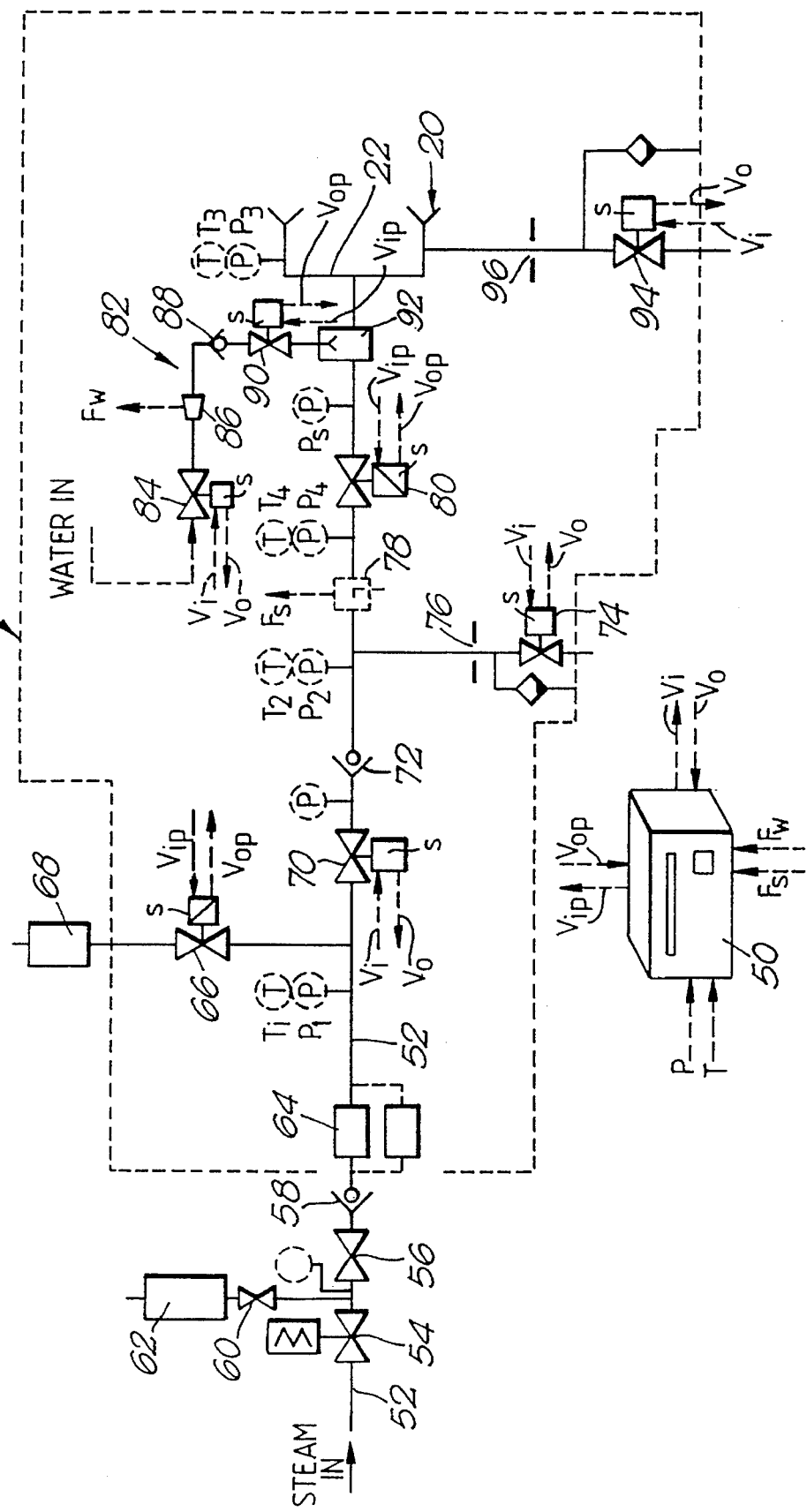
FIG. 3 shows diagrammatically the steam injection apparatus of FIG. 1 in greater detail.

Referring to FIGS. 1 and 2, the gas generator 10 is a gas turbine engine and comprises a compressor 12, a combustor 14 and a turbine 16. The combustor 14 can be of the annular type having a plurality of equispaced dual fuel injectors 18, each having a corresponding steam injector 20 receiving steam from the steam manifold 22. The dual fuel injectors each receive a supply of liquid fuel 24 from a liquid fuel manifold 26 and a supply of gas fuel 28 through an outer gas manifold 30.

Each injector 18 has an inner annular liquid fuel passage 32 connected to the liquid fuel manifold 26 and an outer annular gas fuel passage 34 connected to the gas fuel manifold 30. The liquid and gas fuel passages 32 and 34 have outlet nozzles 36 and 38 respectively. For further details of this injector, refer to British Published Patent Application GB2219070 A.

The engine 10 operates in a conventional manner, that is, air is drawn from atmosphere by the compressor 12, is compressed and supplied to the combustor 14, where gas and liquid fuel is mixed with the compressed air and burnt. The products of combustion drive the turbine 16 which in turn drives the compressor 12. The exhaust from the turbine 16 can then be used to drive a load using a power turbine (not shown). Furthermore, waste heat from the exhaust can be used to raise steam in a waste heat recovery boiler 42 for injection into the gas generator 10, as explained below.

The combustion process in engine 10 produces a number of undesirable emissions, notably unburned carbon and NOx. The level of NOx emissions can be controlled by the injection of steam into the primary zone of the combustor so as to cool the primary zone to a temperature below which most NOx is generated.

The gas generator 10 has a steam supply and injection system generally indicated at 40 in FIG. 1 and shown in more detail in FIG. 3. Referring to FIGS. 1 to 3, the system 40 comprises steam supply plant, in this case a waste heat boiler 42 with integral header 44, a steam injection system 48 which is connected at its inlet to the header 44 and at its outlet to the steam manifold 22, and an electronic controller 50. The injection system 48 is connected to the header 44 via ducting 52 including a steam relief valve 54, a main isolation valve 56, and a non-return valve 58. A vent valve 60 and silencer 62 are connected to the ducting 52 as a side branch between the valves 54 and 56. Valve 54 is a safety feature and automatically blows off if for any reason the steam pressure becomes too high. Valves 56 and 60 are manually operated. Valve 56 is provided to isolate the entire gas turbine engine and injection system from the steam supply in case the engine is to be run without steam, e.g. because the boiler is down for maintenance. Valve 60 is provided to enable steam to be blown off readily to atmosphere if it is desired to generate steam for test or other purposes without feeding it into the injection system 48.

The ducting 52 continues through the injection system 48 and is connected to the steam manifold 22. In flow series, the ducting 52 connects: a strainer 64; a side branch consisting of a steam bleed-off or warm-up valve 66 and a silencer 68 vented to atmosphere; a steam shut-off cock 70; a non-return valve 72; another side branch consisting of a purge valve 74 with an upstream flow restriction 76; a flow meter 78; a steam metering valve 80; and a water and steam mixer or desuperheater 92. The desuperheater 92 is fed with water by another side branch 82 comprising in flow sequence a shut-off cock 84, a flow meter 86, a non-return valve 88, and a water metering valve 90.

A drain valve 94 having an upstream flow restriction 96 is connected to the steam manifold 22 and vents to atmosphere.

In FIG. 3, non-manually operated valves, i.e., those which are servo operated on command from the controller 50, are shown linked to small boxes S, representing their servos. Each servo S has a command input from the controller 50 and a sensor output to the controller representing valve position. Valves 66,80 and 90, being metering valves, are proportionally controlled, with inputs and outputs Vip and Vop respectively, but the other non-manual valves are merely two position valves, with corresponding two-state inputs and outputs Vi and Vo respectively.

The controller 50 receives inputs in the form of valve position signals Vop,Vo (proportional or on/off as appropriate for the valve), water flow rates Fw, steam flow rates Fs, and steam pressure and temperature, P,T. These data are of course input from the non-manual valves, steam flow meter 78, water flow meter 86, and various steam pressure and temperature sensors, shown as circled P and T symbols. The controller 50 also monitors pressure and temperature in the steam header 44. Acting on these inputs, controller 50 is responsible for the execution of the complete control scheme described below. This involves outputs Vi to control all two-position non-manual valves in the system in accordance with schedules and the operation of the proportionally controlled valves. The latter are controlled proportionally by signals Vip from the controller 50 representing scheduled operation and the results of calculations using feedback data Vop from the valves, the sensors P,T and the steam and water flow data, Fs,Fw. We prefer all the functions of the controller 50 to be executed in one complete microprocessor system.

As previously stated, it is assumed here that the boiler/header 42/44 is a heat exchanger arrangement which will extract otherwise waste heat from the exhaust of the power turbine and use it to boil water. In this case, it is convenient if the design of the heat exchanger is such that, apart from the initial warm-up process of the plant, the amount of steam produced at the varying engine operating conditions where steam injection is needed, though variable according to power turbine exhaust temperature and volume, will always be more than sufficient to prevent substantial depletion of the supply of steam in the header in the event of a sudden transition to maximum steam demand for injection into the engine, due to suddenly increased load on the power turbine. However, it would also be possible to utilise the steam injection system with a separately fired boiler, and in this case, as shown in dotted lines in FIG. 1, economic operation of the boiler would demand that the controller 50 be in command of scheduling the fuelling of the boiler through a boiler control 46 so as to reduce fuel usage at low engine power conditions. Of course, the present steam injection system would still require design assurance that the steam produced by the separately fuelled boiler under the command of the controller 50 would always be more than sufficient to prevent too great a reduction in the pressure of the supply of steam in the header 44 due to suddenly increased demand.

The operation of the system 48 will now be described with reference to starting and running the gas generator 10 to illustrate various aspects of the present invention.

Steam Injection System Warm-up and Purging

Figure 4:
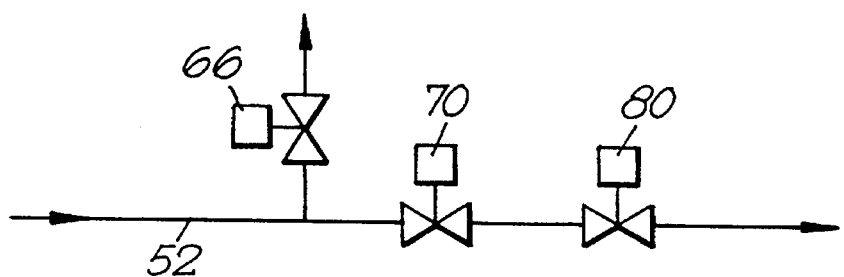
FIG. 4 shows diagrammatically the steam supply control and upstream preheating arrangement of the steam injection apparatus of FIG. 3.

Referring to FIGS. 3 and 4, initially the gas generator 10 is started and run up to minimum steam injection power with the valve 56 open and valves 70 and 66 closed. This operating point may vary according to the characteristics of the installation and local pollution control laws, but could be, say, about 50% load. When the minimum steam injection power is reached, there is a period during which the boiler/header 42/44 warms up. As the steam begins to be generated, the warm up valve 66 and the shut off cock 70 remain closed until the pressure in the header increases to an adequate value, say about 100 p.s.i., 6.8 bar.

Warm-up of the steam injection system then commences when the controller 50 modulates the warm up valve 66 to allow a small flow of steam through the ducting 52 and then through the steam warm-up valve 66, vent line and silencer 68 to atmosphere. The steam pressure P1 and flow rate from the steam header into the system 48, are increased by further opening of the steam warm-up valve 66 on a ramp schedule. If necessary in the particular installation, the controller 50 also signals the boiler control 46 to increase the boiler heating rate appropriately. Steam pressure and temperature P1,T1 increase until they reach the required values and all the pipe work and valves have been warmed up as far as the shut-off cock 70 and purged of condensates.

The warm up valve 66 is a reverse acting valve, i.e. it is permanently biased to the open position so that its servo requires energising all the time to keep it closed. Thus, if the servo or power supply fails, or if the servo receives no signal from the controller 50, the valve will automatically open as a safety precaution to avoid risks of overpressurizing the injection system.

While steam pressure and temperature is being increased in the above way, the apparatus downstream of the shut-off cock 70 is purged and heated using compressor delivery air from the compressor 12 of the gas generator.

Referring particularly to FIG. 3, the valves 74 and 94 are scheduled by the controller 50 to purge and preheat the steam ducting downstream of the shut-off cock 70 and to drain the steam manifold 22. The purge valve 74 is opened prior to the shut-off cock being opened and again after the shut-off cock 70 is closed. When the purge valve 74 moves to the open position and the gas generator is operating at the desired power, a proportion of the compressor delivery air from the compressor 12 at the free surface of the steam injectors 22 will flow to atmosphere through the ducting 52, the steam metering valve 80 and the purge valve 74. The compressed air will therefore purge this portion of the steam injection system of any condensate, and as it is at a relatively high temperature it will also preheat the ducting and valves downstream of the shut-off cock 70. The controller 50 modulates the steam metering valve 80 to control the rate of temperature increase within acceptable limits by varying the restriction in the throttling area of the valve.

The drain valve 94 is connected to atmosphere and to a collector block (not shown) on the steam manifold 22. The valve 94 is operated by the controller 50 while the shut-off cock 70 is shut and compressed air from the compressor 12 will flow through the steam injectors 20 into the steam manifold 22 and through the valve 94 to atmosphere, so that any condensate in the collector block will be exhausted to atmosphere rather than being ejected into the gas generator when the steam supply is turned on.

The sequence of events for the operation of the valves 70,74,80 and 94 is as follows. The gas generator is operated at a required power with the shut-off cock 70 closed. The steam metering valve 80 is operated by the controller 50 to pass the air flow required for preheating the steam ducting, the controller also opening the purge valve 74 to obtain a through flow. The controller 50 schedules the air flow through this part of the system by comparing T1 and T2 and using valve 80 to control the rate of rise of T2. When T2 is greater than or equal to T1 for a set period of time (say, 30 seconds), then simultaneously the shut-off cock 70 is commanded open and the steam metering valve 80 is operated to allow an initial steam flow. The amount of initial steam flow is determined by valve stability at low steam flows, and the ability of the gas generator to continue operating without surge or flame out. At the same time, the controller 50 closes the purge valve 74 and also commands the steam warm-up valve 66 to close by an amount proportional to the initial steam flow into the gas- generator, thereby maintaining constant steam input into the system 48. The drain valve 94 is finally closed after a further predetermined period of time, for example 30 seconds.

Normal Operation of the Steam Injection System

The steam flow to the gas generator during normal operation of the steam injection system is controlled automatically by the controller 50 by modulating the steam flow through the steam metering valve 80 and simultaneously modulating the steam flow through the steam warm-up valve 66 in order to maintain a constant steam flow rate into the system 48 from the steam supply header. Hence, if steam flow to the gas turbine engine is increased, the steam flow through valve 66 is reduced, but if steam flow to the engine is reduced, steam flow through valve 66 is increased. It will therefore be understood that during operation of the steam injection process, the controller 50 uses the warm-up valve as a bleed-off valve for venting excess steam to atmosphere. The frequency responses of the valves 66 and 80 are substantially identical so that during a transient operation of the gas generator the steam header output flow rate can be maintained at a constant value, even though the supply of steam to the engine is varied.

To amplify the above statements, it is noted that the dynamic similarity of the steam warm up valve 66 and the steam metering valve 80, and the fact that the former valve is reverse acting, enables the controller 50 to operate the two valve servos or actuators in phase with each other at all times. This achieves total instantaneous control of the steam injection system 48, the steam warm up valve 66 being used to dynamically assist the ability of the injection system to dump, or refrain from dumping, steam during rapid or instantaneous load changes on the power turbine. Hence, for example, the controller can not only quickly reschedule the steam supply to maintain a required steam/fuel ratio, but can also stop steam delivery to the manifold 22 completely during a slam deceleration to idle power conditions, thereby preventing flame out of the combustor due to excess steam injection.

The controller 50 can be programmed to work out the relative settings of the two valves 66 and 80 using as a basis the well known Fisher Universal Sizing Equation (metric version). This can be expressed for both valves as $$Cg = \frac{2.18\ Qs}{\sqrt{(d\ Pa/100)}\ \sin[103.9\ \sqrt{(1 - Pb/Pa)}]\text{degrees}}$$

where:

Qs can be expressed for each valve as the currently required percentage of the maximum steam flow into the system 48; for the steam metering valve 80 it is the flow currently required by the engine to keep within predetermined fuel:steam ratio limits and for the warm-up valve 66 it is the flow from the steam header minus the flow to the engine;

d is the density of the steam derived from look up steam tables using P1 and T1;

Pa and Pb are the steam pressures on opposed sides of the valves, so that for the warm-up valve 66 Pa=P1 and Pb= (say) atmospheric pressure, and for the steam metering valve 80, Pa=P4 and Pb=P5; and Cg is the throat area of the valve necessary to pass the currently required steam flow therethrough. The value derived for Cg can then be used in another look up table to read off the required valve actuator position from the known valve characteristic. This currently required position can then be compared to the actual position of the valve actuator to derive an error signal and the error signal can then used to modulate the valve actuator position to achieve zero error.

Control of Steam Temperature

Because of the way that the valves 66 and 80 are scheduled together to control the entry of steam to the fuel injection system, the temperature and pressure of the steam in the header 42 can be readily maintained at an optimum, giving an assured desired degree of superheat at the steam manifold 22. This assumes known boiler operational characteristics.

Figure 5:
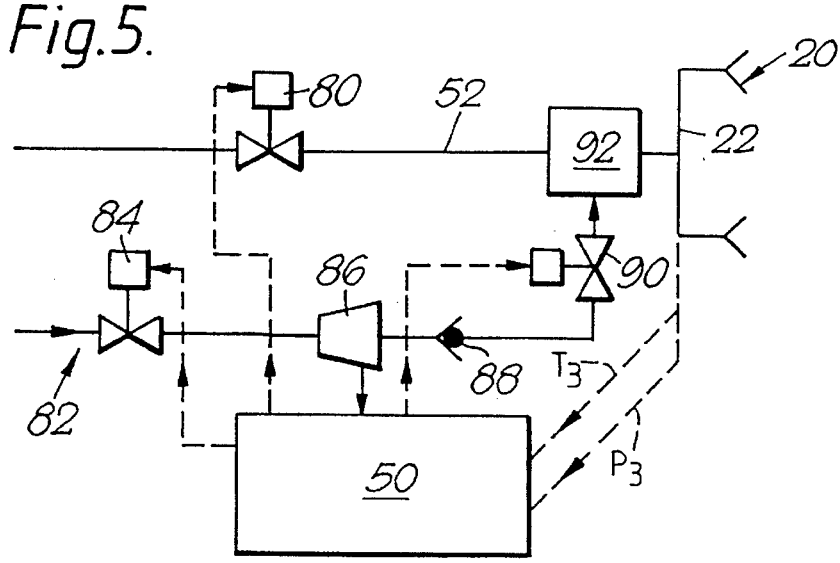
FIG. 5 shows diagrammatically a steam manifold temperature control apparatus of the steam injection apparatus of FIG. 3.

It is possible that in some situations of use of the invention, the steam available to the injection system would be too hot for injection into the engine. This could be due, e.g., to particular steam generator characteristics or to sharing of the steam supply with a variable demand process. As illustrated in FIG. 5, such a steam condition would be indicated to the controller 50 by the sensed temperature T3 and pressure P3 at the steam manifold. In this case the controller 50 would open the stop cock 84 in water supply branch 82 and then using information signaled from the water flow meter 86 and temperature and pressure sensors, schedule the water metering valve 90 and the steam metering valve 80 to inject water and steam into the mixer 92 as a de-superheating step to control the steam condition. By the time the water and steam mixture reaches the steam manifold 22 the mixture should be homogenous.

Note additionally that in the water supply branch 82, a non-return valve 88 is positioned between the flow meter 86 and the metering valve 90 as a precaution against back pressures from the mixer 92, which is of the vortex type.

Figure 6:
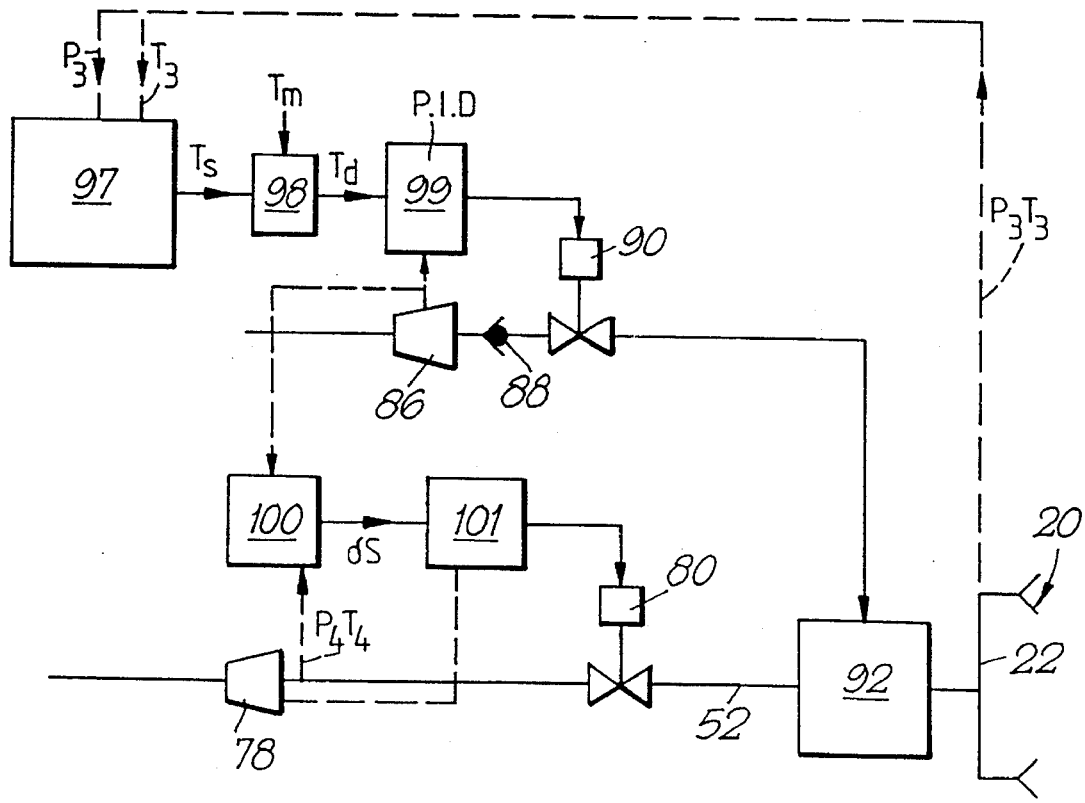
FIG. 6 shows the control apparatus of FIG. 5 in greater detail.

Control of the steam and water metering valves for desuperheating will be described in more detail for FIG. 6. Here, the controller 50 of the previous figures is shown as control algorithms 97 to 99 for the water metering valve 90 and algorithms 100 and 101 for the steam metering valve 80.

With respect to control of the water metering valve 90, the algorithm 97 receives the steam manifold pressure $P_3$ and temperature $T_3$ signals and calculates the degree of superheat Ts. This is compared in algorithm 98 with a predetermined set point Tm for correct steam injection conditions in the steam manifold 22. The deviation Td is fed to the water metering valve control algorithm 98, along with the water mass flow rate data from the meter 86. If the steam is too hot, the algorithm 98, which is of the proportional integral derivative type, increases the water flow to the mixer 92 by opening the water metering valve 90, and if the steam is too cool it reduces the water flow. At the same time the algorithm 100 is also receiving water mass flow data from meter 86 and steam temperature and pressure data T4,P4 from a position in the steam line 52 after the steam mass flow rate meter 78. Using these inputs, it calculates the amount of reduction δs needed in the steam flow rate through steam metering valve 80 to compensate for the flow of water into the mixer 92. The error value δs is then fed into steam metering valve control algorithm 101 along with the actual steam mass flow rate data from the meter 78 in line 52, and the correct setting for the steam metering valve 80 is calculated and signaled to the valve.

Gas Manifold Purging

Figure 7:
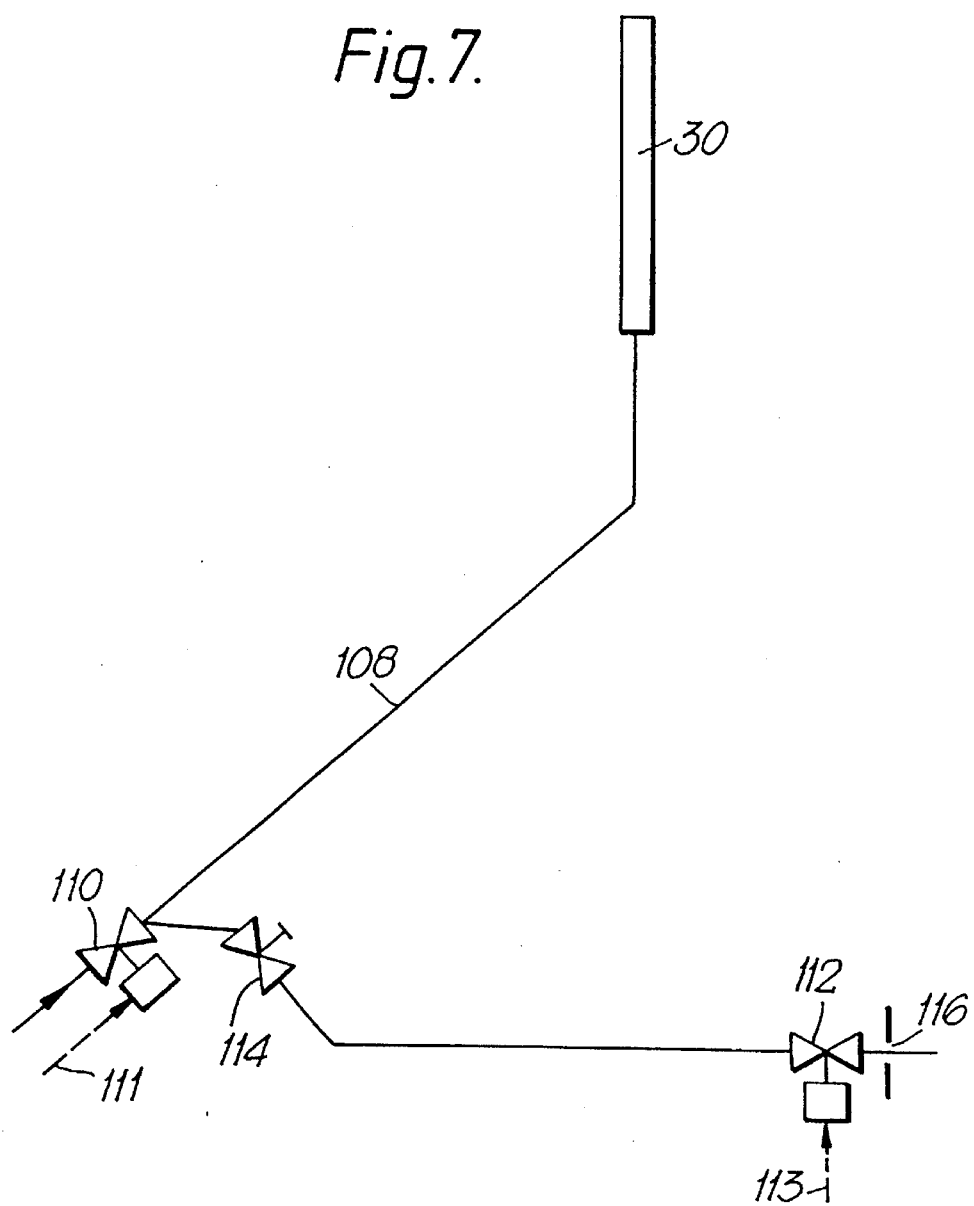
FIG. 7 shows a gas fuel manifold drain apparatus for use with the steam injection apparatus shown in FIG. 2.

Referring now to FIG. 7, the gas manifold 30 of the gas generator can be provided with a condensate purging system. The gas fuel manifold 30 has a fuel supply line 108 with a high speed shut-off cock 110 controlled by signals 111 from the controller 50. A condensate purge valve 112, again controlled by signals 113 from the controller 50, is connected to the supply line 108 immediately after the gas shut-off cock 110 through a manual shut-off cock 114, which may be needed to facilitate maintenance. The valve 112 vents to atmosphere through a restriction 116.

The arrangement shown in FIG. 7 enables any condensate which collects in the gas fuel manifold when the gas generator is operating on liquid fuel and steam injection to be vented to atmosphere. The removal of the condensate prevents the condensate being ejected into the gas generator when the fuel supply is transitioned, while the engine is running, from liquid fuel with steam injection to gas fuel with or without steam injection, or when the gas generator is restarted on gas fuel with or without steam injection, after it has been running on liquid fuel with steam injection. Hence, the purge valve 112 is only opened when the gas generator is running on liquid fuel with steam injection, the shut-off cock 110 being closed and the manual valve 114 open. The controller 50 opens the purge valve 112 and high pressure compressor delivery air and steam mixture is drawn from the gas generator through the purge holes in the gas fuel manifold 34 in each dual fuel injector 18. Any condensates are ejected from the gas fuel manifold 30 through the gas fuel supply line 108, the valves 114 and 112 and the restriction 116 to a safe area where personnel and equipment cannot be harmed.

This gas manifold purge system is disabled by the controller while gas fuel is being used by the engine, and also while steam injection is not being used. In the scheduling of the valves by the controller 50, it is also ensured that when transferring from liquid to gas fuel, the gas shut-off cock 110 and the purge valve 112 are not open at the same time.

The provision of the restriction 116 enables the purge flow through the valve 112 to be reduced as required to prevent excessive bleed-off of high pressure air which would impair the performance of the engine.

Advantages of the Disclosed Steam Injection System

It will be appreciated that the steam injection and control system according to the present invention provides a number of advantages. The supply of steam to the injection system 48 can be controlled to a suitable excess value as convenient and the amount of steam injected into the combustor can be controlled by scheduling of the steam warm-up valve 66 together with the steam metering valve 80 to provide the steam mass flow demanded by the gas generator. Thus the steam required by the gas generator is available rapidly and is independent of the response rate of the boiler or other steam supply system.

While the steam shut-off cock 70 is closed, steam can be used to preheat the steam ducting and valves upstream of the steam shut-off cock 70 by venting steam through the steam warm-up valve 66. At the same time, the portion of the apparatus downstream of the shut off cock 70 can be preheated and purged using compressor delivery air vented to atmosphere through the purge valve 74. The procedure is to open the steam metering valve 80 to about its 40% open position and then bleed air backwards through the system to heat it up. This preheating of the ducting and valves of the apparatus preserves the quality of the steam and prevents thermal shock to the valves. Having achieved a suitable temperature in the system, the steam metering valve 80 is repositioned to an initial flow demand position, which will give, say, about 10% of the currently required steam flow, and then the valve is progressively opened further to increase the steam flow steadily up to the required value. This procedure avoids premature extinction of the flame due to shock and over-rapid quenching of the combustion process.

We claim:

1. A steam injection system for a combustion turbine gas generator, comprising;

steam supply means, steam injection means for injecting steam into the gas generator, a steam shut-off cock between the steam supply means and the steam injector means, a steam warm-up valve for allowing steam to exit the system from a point in the system upstream of the shut-off cock to a lower pressure location, and control means for maintaining the shut-off cock closed whilst the steam pressure and temperature increase to operational values prior to injection of steam into the gas generator and for simultaneously opening the steam warm-up valve to vent a flow of steam through the warm-up valve to preheat the steam injection system upstream of the shut-off cock.

2. A steam injection system according to claim 1, including a steam relief valve and a main isolation valve located upstream of the exit point for the steam warm-up valve.

3. A steam injection system according to claim 1 or claim 2, in which the steam warm-up valve vents to atmosphere.

4. A steam injection system for a combustion turbine gas generator comprising a compressor and a combustor downstream of the compressor, the steam injection system comprising;

steam supply means, steam injector means for injecting steam into the gas generator downstream of the compressor, a shut-off cock, a steam metering valve downstream of the shut-off cock, a purge valve connected to the system between the shut-off cock and the steam metering valve, and control means for closing the shut-off cock prior to initiation of steam injection and opening the steam metering valve and the purge valve to allow compressed air to flow from the gas generator compressor through the steam injectors, the steam metering valve and the purge valve to exit from the system, thereby to preheat and purge the steam injection system downstream of the shut-off cock.

5. A steam injection system according to claim 4, having control means for modulating the degree of opening of the steam metering valve thereby to control the rate of temperature rise in the system downstream of the steam shut-off cock.

6. A steam injection system according to claim 4 or claim 5, having control means for re-scheduling the steam metering valve to an initial steam injection flow demand position when the temperature of the steam injection system downstream of the shut-off cock has reached a predetermined value.

7. A steam injection system according to any one of claims 4 to 6, having a drain valve connected to the steam injection means and control means for temporarily opening the drain valve prior to steam injection to allow compressor delivery air from the gas generator to flow through the steam injection means thereby to vent any condensate in the steam injection means through the drain valve.

8. A steam injection system for a combustion turbine gas generator having a compressor and a combustor downstream of the compressor, the steam injection system comprising;

steam supply means, steam injection means for injecting steam into the gas generator downstream of the compressor, a steam metering valve located between the steam supply means and the steam injection means for metering the supply of steam from the steam supply means, a steam bleed-off valve for bleeding off steam from a point in the steam injection system prior to the steam metering valve, a steam shut off cock between the steam bleed-off point and the steam metering valve, control means for shutting the shut-off cock And opening the steam bleed-off valve and the steam metering valve prior to commencement of steam injection into the gas generator to allow steam from the steam supply means to pass through the steam bleed-off valve and air from the gas generator compressor to pass through the steam metering valve, thereby preheating and purging the system, and control means for opening the shut-off cock and modulating the steam bleed-off valve and the steam metering valve in concert with each other during injection of steam into the gas generator such that the supply of steam to the gas generator is varied relative to the supply from the steam supply means.

9. A steam injection system according to claim 8, including means for controlling the condition of the steam in the steam injection means.

10. A steam injection system according to claim 8 or claim 9, the gas generator combustor being capable of operating with both gas and liquid fuel, in which the gas fuel is supplied through a gas fuel manifold, there being also provided means for purging the gas fuel manifold of condensate caused by operation of the gas generator on liquid fuel with steam injection, said means for purging the gas fuel manifold comprising a purge valve connected to the gas manifold and control means for opening said purge valve during or after operation of the gas generator on liquid fuel with steam injection to allow high pressure air from the compressor to flow through said gas fuel manifold and said purge valve.

11. A combustion turbine gas generator having an air compressor, a combustor, a turbine, and a steam injection system comprising;

steam supply means, steam injection means for injecting steam into the combustor, a steam shut off valve located between the steam supply means and the steam injection means, steam warm up and purge valve means for controlling a flow of steam from the steam supply means out of the system from a location between the steam supply means and the shut off valve, thereby to achieve preheating and purging of a part of the system upstream of the steam shut off valve, said steam warm up and purge valve means being located immediately upstream of the steam shut off valve air warm up and purge valve means for controlling a flow of compressed air from the compressor out of the system from a location between the shut off valve and the steam injection means, thereby to achieve preheating and purging of a part of the system downstream of the steam shut off valve, a steam metering valve located between the steam shut off valve and the steam injection means, the air warm up and purge valve means controlling a flow of compressed air from the compressor out the system from a location between the shut off valve and the steam metering valve and control means for coordinating operation of the steam shut off valve and both the valve means to achieve the preheating and purging of the system by closing the shut-off valve, opening the steam warm up and purge valve means to allow a preheating flow of steam to pass through the part of the system upstream of the shut-off cock, and opening the air warm up and purge valve means to allow a preheating flow of air from the compressor to pass through the part of the system downstream of the shut off cock, said control means being adapted to open the steam metering valve while the steam shut off valve is closed to allow the preheating air to flow therethrough.

12. A gas generator according to claim 11, the steam injection system including steam injection temperature control means.

13. A gas generator according to claim 11 or 12, the combustor being capable of being fired with both gas and liquid fuel, the gas fuel being supplied through a gas fuel manifold, there being also provided means for purging the gas fuel manifold of condensate using high pressure air from the compressor during or after operation of the gas generator on liquid fuel with steam injection.

14. A gas generator according to claim 13, in which said means for purging the gas fuel manifold comprises a purge valve connected to the gas manifold and control means for opening said purge valve after operation of the gas generator on liquid fuel with steam injection to allow high pressure air from the compressor to flow through said gas fuel manifold and said purge valve.

15. A gas generator according to claim 14, in which a manual shut-off cock is located upstream of the purge valve.

16. A gas generator according to claim 14, in which a flow restriction is located downstream of the purge valve.

17. A gas generator according to claim 11, in which the air warm up and purge valve means includes a purge valve located to vent externally of the gas generator from a point between the steam shut-off cock and the steam injection means, the control means being adapted to open the purge valve while the shut-off cock is closed to allow the preheating air to flow therethrough and to purge the system of any condensate.

18. A gas generator according to claim 11, comprising control means for monitoring the temperature of the steam injection system downstream of the shut-off cock and modulating the steam metering valve to control the rate of temperature rise within predetermined limits.

19. A gas generator according to claim 11, in which the steam injection means is provided with a drain valve and control means for opening the drain valve prior to commencement of steam injection to allow compressed air from the compressor to flow therethrough to purge any condensate in the steam injection means through the drain valve.

20. A gas generator according to claim 12, in which the steam injection temperature control means comprises a steam metering valve, a water and steam mixer downstream of the steam metering valve, a water metering valve for metering water into the mixer, and control means for monitoring the condition of the steam in the steam injection means and modulating the water metering valve and the steam metering valve to maintain the degree of superheat of the steam in the steam injection means within a predetermined band.

* * * * *